US005631087A

United States Patent [19]

Fukuda et al.

[11] Patent Number: 5,631,087

[45] Date of Patent: May 20, 1997

[54] ELECTROSTATIC IMAGE-BEARING DIELECTRIC MEMBER

[75] Inventors: Yuzuru Fukuda; Shigeru Yagi; Tsuyoshi Ohta; Masato Ono, all of Minami-ashigara, Japan

[73] Assignee: Fuji Xerox Co., Ltd., Tokyo, Japan

[21] Appl. No.: 479,566

[22] Filed: Jun. 7, 1995

Related U.S. Application Data

[62] Division of Ser. No. 136,768, Oct. 15, 1993, abandoned.

[30] Foreign Application Priority Data

Nov. 11, 1992 [JP] Japan ..................................... 4-324704

[51] Int. Cl.[6] ........................................................ B23B 9/00

[52] U.S. Cl. .......................... 428/408; 428/698; 428/688; 347/112; 347/120

[58] Field of Search .............................. 428/306.6, 307.3, 428/307.7, 446, 195, 698, 688; 430/84, 95; 397/112, 120, 123

[56] References Cited

U.S. PATENT DOCUMENTS

| | | | |
|---|---|---|---|
| 4,634,648 | 1/1987 | Jansen | 430/84 |
| 4,882,256 | 11/1989 | Osawa | 430/66 |
| 4,939,056 | 7/1990 | Hotomi | 430/66 |
| 5,165,991 | 11/1992 | Fukuda | 428/195 |
| 5,256,509 | 10/1993 | Hayashi | 430/66 |

FOREIGN PATENT DOCUMENTS

| | | |
|---|---|---|
| 60-50083 | 3/1985 | Japan . |
| 61-144651 | 7/1986 | Japan . |
| 61-193157 | 8/1986 | Japan . |
| 63-294586 | 12/1988 | Japan . |

*Primary Examiner*—Patrick Ryan
*Assistant Examiner*—Patrick Jewik
*Attorney, Agent, or Firm*—Oliff & Berridge

[57] ABSTRACT

An electrostatic image-bearing dielectric member comprises a support and a dielectric layer formed on the support. The dielectric layer is formed of at least one of amorphous carbon, diamond-like carbon and diamond. The dielectric layer may contain not larger than 60 atomic percent of at least one of hydrogen and fluorine. An intermediate layer may be provided between the support and the dielectric layer in order to improve the adhesion therebetween.

20 Claims, 1 Drawing Sheet

ELECTROSTATIC IMAGE-BEARING DIELECTRIC MEMBER

This is a Division of application Ser. No. 08/136,768 filed Oct. 15, 1993, now abandoned.

BACKGROUND OF THE INVENTION

1. Field of The Invention

This invention relates to an electrostatic image-bearing dielectric member which is suitable for use in ionography.

2. Description of The Related Art

In recent years, there has been carried out, as one of copying or printing processes, an image-forming process using so-called ionography. The process comprises providing a support drum having a dielectric film thereon as an electrostatic image-bearing dielectric member, generating ions or charged particles by means of an ion generator to form an electrostatic image on the surface of the dielectric member, developing the thus formed electrostatic image with a toner, and transferring and fixing the developed image on a copying material.

The known dielectric member used in the ionography makes use of a porous anodized aluminum film as the dielectric layer. Since the porous anodized aluminum film has a multitude of fine pore openings, it is disadvantageous in that the wear resistance is poor and toner particles are liable to enter the pores thereby causing the image quality to be worsened. To avoid this, there has been proposed a method wherein after the formation of the porous anodized aluminum film, the film is subjected to adsorption with silane coupling agents and then impregnated with epoxy resins (Japanese laid-open Patent Application No. 63-294586). For sealing the pores of the porous anodized aluminum film, there is known a method which makes use of waxes as a sealant (Japanese Laid-open Patent Application No. 60-50083), or a method wherein polytetrafluoroethylene is impregnated (Japanese Laid-open Patent Application No. 61-193157).

Aside from the anodized aluminum film, the dielectric film has also been fabricated from a mixture consisting of inorganic powder, lubricants and film-forming resins (Japanese laid-open Patent Application No. 61-144651).

However, where the anodized aluminum film is adsorbed with silane coupling agents and impregnated with epoxy resins or is impregnated with epoxy resins containing silane couplers, there arises the problem that the surface hardness is not satisfactory and the relative dielectric constant is larger than about 7, so that satisfactorily high chargeability cannot be obtained. Moreover, after the adsorption and impregnation steps, additional steps of baking the resin and eliminating the surface layer of the resin are necessary, with the attendant problem that the procedure becomes complicated with a reduction in yield and reproducibility of film characteristics. Alternatively, where waxes or polytetrafluoroethylene are provided as a sealant and impregnated, chargeability and surface hardness are not satisfactory because they are very low, coupled with another problem that these materials do not provide adequate adhesion to the anodized aluminum film.

When the dielectric layer made of a mixture of inorganic powder, lubricants and film-forming resins, the dielectric layer becomes embrittled owing to the presence of the inorganic powder and the fabrication process becomes complicated, with the problem that the yield is reduced.

SUMMARY OF THE INVENTION

It is accordingly an object of the invention to provide an electrostatic image-bearing dielectric member which overcomes the problems involved in the prior art.

It is another object of the invention to provide an electrostatic image-bearing dielectric member which exhibits good chargeability, high surface hardness and high reproducibility of film characteristics.

It is a further object of the invention to provide an electrostatic image-bearing dielectric member which has good wear resistance, good charge retentivity and good ozone resistance.

The above objects can be achieved, according to the invention, by an electrostatic image-bearing dielectric member which comprises a support and a dielectric layer formed on the support, the dielectric layer being formed of at least one film selected from the group consisting of an amorphous carbon film, a diamond-like carbon film and a diamond film.

The term "diamond film" used herein is intended to mean a film which is observed to exhibit a diffraction peak or a diffraction pattern ascribed to the diamond structure when subjected to X-ray diffraction or electron beam diffraction. Likewise, the term "diamond-like carbon film" means a film which is hard and is not fundamentally observed to have a clear diffraction pattern when subjected to X-ray or electron beam analysis, but which is observed to have a peak corresponding to or similar to that of diamond when analyzed according to Raman spectroscopy.

BRIEF DESCRIPTION OF THE DRAWING

The sole FIGURE is a schematic sectional view of an electrostatic image-bearing dielectric member according to the invention.

DETAILED DESCRIPTION AND EMBODIMENTS OF THE INVENTION

Figure 1:
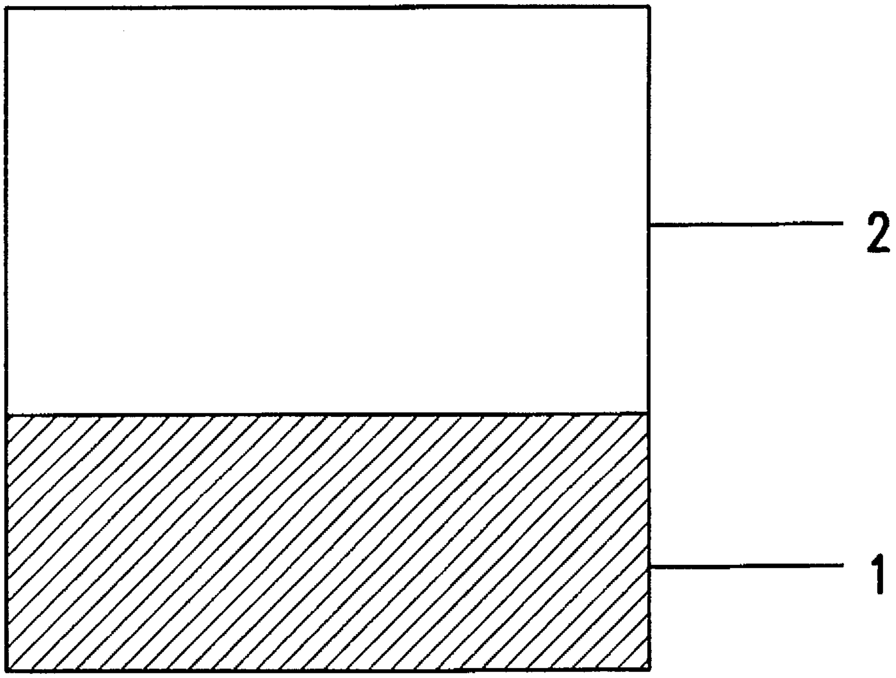

Reference is now made to the accompanying drawing which schematically shows an electrostatic image-bearing dielectric member M. The member M includes a support 1 and a dielectric layer 2 formed on the support 1 as shown.

The support 1 is made, for example, of conductive materials such as aluminum and its alloys (hereinafter referred to generically as aluminum), other metals and alloys thereof such as steels, stainless steels, nickel, chromium, molybdenum, tungsten and the like, and insulating materials such as glass, ceramics and the like.

When an insulating support is used, it is necessary to make a conductive surface which contacts the dielectric layer. Moreover, if the insulating support is arranged to have a buildup structure, a conductive sub-layer may be formed in the inside or as a lowermost layer of the insulating support. As a consequence, part or all of the insulating support may be built in the dielectric layer.

The aluminum materials include, aside from pure aluminum, Al—Mg, Al—Mg—Si, Al—Mg—Mo, Al—Mn, Al—Cu—Mg, Al—Cu—Ni, Al—Cu, Al—Si, Al—Cu—Zn, Al—Cu—Si alloys and the like.

In the practice of the invention, it is preferred that if part or all of the support is constituted of a material whose Young's modulus is not smaller than 150 GPa, the electrostatic image-bearing dielectric member is more improved in impact and damage resistances as a whole. The materials whose Young's modulus is not smaller than 150 GPa include, for example, metals such as iron, steels, stainless steels, molybdenum, tantalum, nickel and cobalt, and ceramics such as silicon nitride, zirconium boride and the like.

According to the invention, the support has thereon at least one dielectric layer selected from an amorphous carbon film, a diamond-like carbon film and a diamond film. This dielectric layer can be formed by a number of processes such as glow discharge, sputtering, ion plating, electron beam evaporation, high frequency CVD, hot filament CVD, microwave CVD and the like.

The thickness of the dielectric layer may not be critical and is preferably in the range of from 0.5 to 40 μm, more preferably from 5 to 25 μm. If the thickness is smaller than 0.5 μm, satisfactory chargeability may not be obtained. If the thickness over 40 μm, the formation time is undesirably prolonged with a lowering of productivity. Thus, the above range is preferred.

For convenience's sake, the formation of the dielectric layer by plasma CVD (chemical vapor deposition) is described.

Starting materials used to form the dielectric layer include, for example, paraffinic hydrocarbons such as methane, ethane, propane, butane, pentane and the like; acetylenic hydrocarbons such as acetylene, allylene, butyne and the like; alicyclic hydrocarbons such as cyclopropane, cyclobutane, cyclopentane, cyclohexane and the like; aromatic hydrocarbons such as benzene, toluene, xylene, naphthalene, anthracene and the like; and halogenated hydrocarbons such as carbon tetrachloride, chloroform, chlorotrifluoromethane, dichlorodifluoromethane and the like.

The dielectric layer is formed under conditions of a frequency of from 0 to 5 GHz, preferably from 0.5 to 3 GHz, a degree of vacuum at the time of discharge of from $10^{-5}$ to 5 Torr., (i.e. 0.001 to 665 Pa) and a substrate temperature of from 50° to 400° C.

Depending on the layer-formation conditions, the type of carbon film is arbitrarily changed. In any case, the amorphous carbon film, diamond-like carbon film or diamond layer is formed by the above process. The layer has usually a Vickers hardness of not smaller than 1000 and is thus very useful in prolongation of the life of the dielectric layer.

In the practice of the invention, the dielectric layer may contain not larger than 60 atomic % of at least one of hydrogen and fluorine therein as will be particularly described in examples. The content of the element is preferred because of improved film characteristics such as a film hardness, electric characteristics and the like.

In the practice of the invention, there may be provided at least one intermediate layer between the support and the dielectric layer. The intermediate layer is made of a material selected from silicon carbide, silicon nitride, silicon oxide and amorphous silicon. The provision of the intermediate layer contributes to improvement in adhesion between the support and the dielectric layer. The intermediate layer may be formed on the support by glow discharge, sputtering, ion plating or plasma CVD.

The intermediate layer is not critical with respect to the thickness and is preferably in the range of from 0.1 to 5 μm. If the thickness is smaller than 0.1 μm, the adhesion is not improved significantly. On the contrary, when the thickness is over 5 μm, it takes a long time before completion of the film formation, resulting in a lowering of productivity.

Where the intermediate layer made of silicon carbide is formed using plasma CVD, silanes or derivatives thereof and hydrocarbons are used in combination. Examples of the silanes or their derivatives include $SiH_4$, $Si_2H_6$, $SiCl_4$, $SiHCL_3$, $SiH_2Cl_2$, $Si_3H_8$, $Si_4H_{10}$ and the like. Examples of the hydrocarbons include paraffinic hydrocarbons such as methane, ethane, propane, butane, pentane and the like; olefinic hydrocarbons such as ethylene, propylene, butylene, pentene and the like; acetylenic hydrocarbons such as acetylene, allylene, butyne and the like, alicyclic hydrocarbons such as cyclopropane, cyclobutane, cyclopentane, cyclohexane and the like; aromatic hydrocarbons such as benzene, toluene, xylene, naphthalene, anthracene and the like; and halogenated hydrocarbons such as carbon tetrachloride, chloroform, chlorotrifluoromethane, dichlorodifluoromethane and the like.

When the intermediate layer made of silicon nitride is formed, the above-indicated silanes or derivatives thereof are used in combination with nitrogen or nitrogen-containing compounds. Examples of the nitrogen-containing compound include $NH_3$, $N_2H_4$, $HN_3$ and the like.

When the intermediate layer made of silicon oxide is formed, the above-indicated silanes or derivatives thereof are used in combination with oxygen or oxygen-containing compounds. Examples of the oxygen-containing compounds include carbon monoxide, carbon dioxide, nitrogen monoxide, nitrogen dioxide and the like.

When an amorphous silicon film is formed, the above-indicated silanes or derivatives thereof are used alone.

The conditions for forming the intermediate layer according to the plasma CVD process include, for example, a frequency of from 0.1 to 30 MHz, preferably from 5 to 20 MHz, a degree of vacuum at the time of discharge of from 0.1 to 5 Torr., (13.3 to 665 Pa), and a substrate temperature of from 100° to 400° C.

The present invention is more particularly described by way of examples.

EXAMPLE 1

A cylindrical pipe made of an Al—Mg alloy with a purity of 99.99% and having a diameter of about 100 mm was provided as a support, followed by washing with a solvent and ultrasonic washing in pure water. The aluminum pipe was set in a vacuum chamber of a capacitive coupling-type plasma CVD apparatus. While the Al pipe was maintained at 400° C., 100% ethylene gas was passed into the vacuum chamber at a rate of 150 $cm^3$/minute. After keeping the vacuum chamber at an inner pressure of 0.5 Torr. (66.5 Pa), high frequency power of 13.56 MHz was applied, thereby causing glow discharge to be generated. The output power of the high frequency power source was kept at 900 W. In this manner, a diamond-like carbon film about 15 μm thick was formed on the aluminum pipe.

The resultant electrostatic latent image-bearing dielectric member had a relative dielectric constant of 3.3 and had a charge potential (surface potential) of 733 V when applied with a surface charge of 142.8 $nC/cm^2$ as a charge density. The attenuation of the charge potential in relation to the time after charging was very small, i.e., not larger than 1% every 5 seconds. Moreover, the chargeability was measured under conditions at a temperature of 20° C. and a relative humidity of 15% and a temperature of 20° C. and a relative humidity of 75%, revealing that the charge potentials under both conditions were equal to each other.

The dielectric member was subjected to measurement of surface hardness, with the result that the Vickers hardness was 1900 and thus, the surface layer was very hard. The member was installed in an ionographic image-forming apparatus of a press transfer type for evaluation of images, revealing that defect-free, clear images were obtained. No flaw defects caused by the press transfer drum or metallic cleaning blade were observed.

EXAMPLE 2

A cylindrical pipe made of an Al—Mg alloy with a purity of 99.99% and having a diameter of about 100 mm was provided as a support, followed by washing with a solvent and ultrasonic washing in pure water. The aluminum pipe was set in a vacuum chamber of a capacitive coupling-type plasma CVD apparatus. While the Al pipe was maintained at 250° C., 100% ethane gas was passed into the vacuum chamber at a rate of 120 $cm^3$/minute. After keeping the vacuum chamber at an inner pressure of 0.4 Torr. (53.2 Pa), high frequency power of 13.56 MHz was applied, thereby causing glow discharge to be generated. The output power of the high frequency power source was kept at 1000 W. In this manner, an amorphous carbon film about 17 μm thick and containing about 15 atomic % of hydrogen therein was formed on the aluminum pipe.

The resultant electrostatic latent image-bearing dielectric member had a relative dielectric constant of 3.1 and had a charge potential (surface potential) of 884 V when applied with a surface charge of 142.8 $nC/cm^2$ as a charge density. The attenuation of the charge potential in relation to the time after charging was very small, i.e., not larger than 0.8% every 5 seconds. Moreover, the chargeability was measured under conditions at a temperature of 20° C. and a relative humidity of 15% and a temperature of 20° C. and a relative humidity of 75%, revealing that the charge potentials under both conditions were equal to each other.

The dielectric member was subjected to measurement of surface hardness, with the result that the Vickers hardness was 2200 and, thus, the surface layer was very hard. The member was installed in an ionographic image-forming apparatus of a press transfer type for evaluation of images, revealing that defect-free, clear images were obtained. No flaw defects caused by the press transfer drum or metallic cleaning blade were observed.

EXAMPLE 3

A cylindrical pipe made of an Al—Mg alloy with a purity of 99.99% and having a diameter of about 100 mm was provided as a support, followed by washing with a solvent and ultrasonic washing in pure water. The aluminum pipe was set in a vacuum chamber of a capacitive coupling-type plasma CVD apparatus. While the Al pipe was maintained at 250° C., 100% ethylene gas and silane gas were passed into the vacuum chamber at rates of 120 $cm^3$/minute and 180 $cm^3$/minute, respectively. After keeping the vacuum chamber at an inner pressure of 0.5 Torr. (66.5 Pa), high frequency power of 13.56 MHz was applied, thereby causing glow discharge to be generated. The output power of the high frequency power source was kept at 300 W. In this manner, a silicon carbide intermediate layer about 0.5 μm thick was formed on the aluminum pipe.

Subsequently, 100% ethylene gas was passed into the vacuum chamber at a rate of 100 $cm^3$/minute. After keeping the vacuum chamber at an inner pressure of 0.5 Torr. (66.5 Pa), high frequency power of 13.56 MHz was applied, thereby causing glow discharge to be generated. The output power of the high frequency power source was kept at 1000 W. In this manner, an amorphous carbon film about 18 μm thick and containing about 13 atomic % of hydrogen therein was formed on the intermediate layer.

The resultant electrostatic latent image-bearing dielectric member had a relative dielectric constant of 4.2 and had a charge potential (surface potential) of 829 V when applied with a surface charge of 142.8 $nC/cm^2$ as a charge density. The attenuation of the charge potential in relation to the time after charging was very small, i.e. not larger than 1%/5 seconds. Moreover, the chargeability was measured under conditions of a temperature of 20° C. and a relative humidity of 15% and a temperature of 20° C. and a relative humidity of 75%, revealing that the charge potentials under both conditions were equal to each other.

The dielectric member was subjected to measurement of surface hardness, with the result that the Vickers hardness was 2100 and, thus, the surface layer was very hard. The member was installed in an ionographic image-forming apparatus of a press transfer type for evaluation of images, revealing that defect-free, clear images were obtained. No flaw defects caused by the press transfer drum or metallic cleaning blade were observed. In addition, the adhesion between the support and the dielectric layer was good.

EXAMPLE 4

A cylindrical stainless steel pipe having a diameter of about 100 mm was provided as a support, followed by washing with a solvent and ultrasonic washing in pure water. The stainless steel pipe was set in a vacuum chamber of a capacitive coupling-type plasma CVD apparatus. While the Al pipe was maintained at 200° C., 100% methane gas was passed into the vacuum chamber at a rate of 110 $cm^3$/minute. After keeping the vacuum chamber at an inner pressure of 0.5 Torr. (66.5 Pa), high frequency power of 13.56 MHz was applied, thereby causing glow discharge to be generated. The output power of the high frequency power source was kept at 800 W. In this manner, an amorphous carbon film about 15 μm thick and containing about 18 atomic % of hydrogen therein was formed on the aluminum pipe.

The resultant electrostatic latent image-bearing dielectric member had a relative dielectric constant of 3.6 and had a charge potential (surface potential) of 672 V when applied with a surface charge of 142.8 $nC/cm^2$ as a charge density. The attenuation of the charge potential in relation to the time after charging was very small, i.e., not larger than 1.5% every 5 seconds. Moreover, the chargeability was measured under conditions at a temperature of 20° C. and a relative humidity of 15% and a temperature of 20° C. and a relative humidity of 75%, revealing that the charge potentials under both conditions were equal to each other.

The dielectric member was subjected to measurement of surface hardness, with the result that the Vickers hardness was 1600 and, thus, the surface layer was very hard. The member was installed in an ionographic image-forming apparatus of a press transfer type for evaluation of images, revealing that defect-free, clear images were obtained. No flaw defects caused by the press transfer drum or metallic cleaning blade were observed. The impact resistance was good.

COMPARATIVE EXAMPLE

A cylindrical pipe made of an Al—Mg alloy with a purity of 99.99% and having a diameter of about 100 mm was provided as a support, followed by washing with a solvent and ultrasonic washing in pure water. Subsequently, the pipe was placed in a 3 wt % oxalic acid solution provided as an electrolytic solution and a DC voltage of 30 volts was applied between the aluminum pipe and an aluminum cylinder cathode while keeping the solution at 28° C., thereby continuing anodization for 70 minutes. The thus anodized aluminum film had a thickness of 21 μm. The resultant porous anodized aluminum film was treated with a silane coupling agent and then impregnated with an epoxy resin. The silane coupling agent used was γ-glycidopropyltrimethoxysilane and the pipe having the anodized aluminum film was immersed in a 1 wt % aqueous solution of the silane at a bath temperature of 20° C. for 2 minutes. After removal from the solution, the pipe was heated at 100° C. for 15 minutes. Thereafter, an epoxy resin paint (Kancoat 51-L1058 of Kansai Paint Co., Ltd.) was applied onto the pipe by means of a brush and thermally cured at 210° C. for 30 minutes. Thereafter, the surface resin layer was cut off by means of a knife and subjected to surface polishing by use of an abrasive paper to form an electrostatic image-bearing dielectric member.

The dielectric member had a relative dielectric constant of 7.4 and had a charge potential (surface potential) of 457 V when applied with a surface charge of 142.8 $nC/cm^2$ as a charge density. The charge potential was attenuated in relation to the time after the charging.

The dielectric member was subjected to measurement of surface hardness, with the result that the Vickers hardness was 410. The member was set in position of an image-forming apparatus of a press transfer type based on ionography for evaluation of images, revealing that there were obtained images which had partial defects caused by the press transfer drum or metallic cleaning blade.

As will be apparent from the foregoing, the dielectric members of the invention have good chargeability and charge retentivity with good surface hardness. In addition, the members of the invention have good wear, pressure and ozone resistances.

What is claimed is:

1. An ionographic apparatus for transfer of an image, comprising:

an ionographic electrostatic image-bearing dielectric member for receiving an ionographic image on a surface of the dielectric member, said member comprising a support and a dielectric layer formed on the support, the dielectric layer being formed of at least one film selected from the group consisting of an amorphous carbon film, a diamond-like carbon film and a diamond film, and an intermediate layer provided between said support and said dielectric layer and made of at least one member selected from the group consisting of silicon carbide, silicon nitride, silicon oxide and amorphous silicon; and an ion generator capable of forming an electrostatic image on said surface of the dielectric member.

2. An apparatus according to claim 1, wherein said dielectric layer consists essentially of the amorphous carbon film.

3. An apparatus according to claim 1, wherein said dielectric layer consists essentially of the diamond-like carbon film.

4. An apparatus according to claim 1, wherein said dielectric layer consists essentially of a diamond film.

5. An apparatus according to claim 1, wherein said at least one film contains not larger than 60 atomic percent of at least one of hydrogen and fluorine.

6. An apparatus according to claim 1, wherein said dielectric layer is formed by a process which comprises subjecting a starting material selected from the group consisting of paraffinic hydrocarbons, olefinic hydrocarbons, alicyclic hydrocarbons, aromatic hydrocarbons and halogenated hydrocarbons to plasma chemical vapor deposition.

7. An apparatus according to claim 6, wherein said plasma chemical vapor deposition is carried out under conditions of a frequency of from 0 to 5 GHz, a degree of vacuum of from $10^{-5}$ to 5 Torr., and a substrate temperature of from 50° to 400° C.

8. An apparatus according to claim 1, wherein said support is made of a member selected from the group consisting of conductive metals and alloys thereof.

9. An apparatus according to claim 1, wherein said support is made of an insulating material and has a conductive surface which contacts said dielectric layer.

10. An apparatus according to claim 1, wherein said support is a multilayer structure having a conductive layer.

11. An apparatus according to claim 1, wherein said support is partly or wholly constituted of a material whose Young's modulus is not smaller than 150 Pa.

12. An apparatus according to claim 1, wherein said dielectric layer has a thickness ranging from 0.5 to 40 micrometers.

13. An ionographic apparatus for transfer of an image, comprising:

an ionographic electrostatic image-bearing dielectric member for receiving an ionographic image on a surface of the dielectric member, said member comprising a support and a dielectric layer, the dielectric layer being formed of at least one film selected from the group consisting of an amorphous carbon film, a diamond-like carbon film and a diamond film, and wherein said dielectric member is free of an anodized oxidation film; and an ion generator capable of forming an electrostatic image on said surface of the dielectric member.

14. An apparatus according to claim 13, wherein said dielectric layer consists essentially of the amorphous carbon film.

15. An apparatus according to claim 13, wherein said at least one film contains not larger than 60 atomic percent of at least one of hydrogen and fluorine.

16. An apparatus according to claim 13, wherein said dielectric layer is formed by a process which comprises subjecting a starting material selected from the group consisting of paraffinic hydrocarbons, olefinic hydrocarbons, alicyclic hydrocarbons, aromatic hydrocarbons, and halogenated hydrocarbons to plasma chemical vapor deposition.

17. An apparatus according to claim 13, wherein said support is made of a member selected from the group consisting of conductive metals and alloys thereof.

18. An apparatus according to claim 13, wherein said support is made of an insulating material and has a conductive surface which contacts said dielectric layer.

19. An apparatus according to claim 13, wherein said support is a multilayer structure having a conductive layer.

20. An apparatus according to claim 13, further comprising an intermediate layer provided between said support and said dielectric layer and made of at least one member selected from the group consisting of silicon carbide, silicon nitride, silicon oxide and amorphous silicon.

* * * * *